United States Patent [19]

Neville

[11] Patent Number: 4,669,580

[45] Date of Patent: Jun. 2, 1987

[54] POSITIVE LOCK CASTER

[75] Inventor: Donald Neville, Manhattan Beach, Calif.

[73] Assignee: International Glide Mfg. Corp., Glendale, Calif.

[21] Appl. No.: 833,578

[22] Filed: Feb. 26, 1986

Related U.S. Application Data

[63] Continuation of Ser. No. 577,156, Feb. 6, 1984, abandoned.

[51] Int. Cl.$^4$ .............................................. B60B 33/00
[52] U.S. Cl. ................................ 188/1.12; 16/35 R; 188/31; 188/69
[58] Field of Search .................... 188/1.12, 31, 60, 69, 188/177; 16/30, 35 R, 37-39, 47, 48

[56] References Cited

U.S. PATENT DOCUMENTS

| Re. 10,305 | 4/1883 | Pederson | 16/37 X |
|---|---|---|---|
| 264,095 | 9/1882 | Merriman | 16/37 |
| 344,988 | 7/1886 | Richmond | 16/48 |
| 440,875 | 11/1890 | Clark | 16/48 |
| 740,267 | 9/1903 | Gamble | 188/69 |
| 816,269 | 3/1906 | Stengel | 16/48 |
| 3,002,589 | 10/1961 | Cook | 188/69 |
| 3,199,141 | 8/1965 | Fontana | 16/38 X |
| 3,608,693 | 9/1971 | Stosberg et al. | 16/35 R X |
| 3,690,415 | 9/1972 | Nordskog | 188/31 X |
| 4,110,866 | 9/1978 | Ishii | 188/1.12 X |
| 4,120,071 | 10/1978 | Cresenzi | 16/38 X |
| 4,143,442 | 3/1979 | Harlang | 188/1.12 X |
| 4,333,207 | 6/1982 | Atwood | 188/1.12 X |
| 4,479,566 | 10/1984 | Ishii | 188/1.12 |
| 4,550,808 | 11/1985 | Folson | 188/1.12 |

FOREIGN PATENT DOCUMENTS

| 2203919 | 8/1973 | Fed. Rep. of Germany | 16/35 R |
|---|---|---|---|
| 34901 | 2/1984 | Japan | 16/35 R |
| 22608 | of 1902 | United Kingdom | 16/38 |
| 2151470 | 7/1985 | United Kingdom | 16/35 R |

Primary Examiner—Douglas C. Butler
Attorney, Agent, or Firm—Romney Golant Martin Seldon & Ashen

[57] ABSTRACT

A caster is provided which makes use of a wheel that has discrete notches and that is rotatably mounted to a housing, a locking pin that is movably mounted to the housing to engage (or to disengage from) any one of the notches, and an actuator for use by a user in moving the locking pin into engagement (or disengagement). The housing also has a distinct notch into which the locking pin moves when it engages any of the wheel notches, so that locking force is borne by the housing rather than by the actuator. The notches are preferably defined in an internal surface of the wheel. Advantageously two identical wheels are used in opposition, for optimum strength and appearance.

20 Claims, 12 Drawing Figures

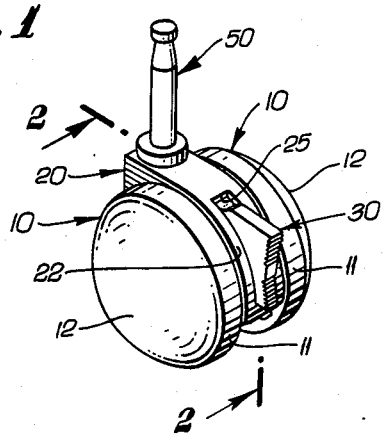
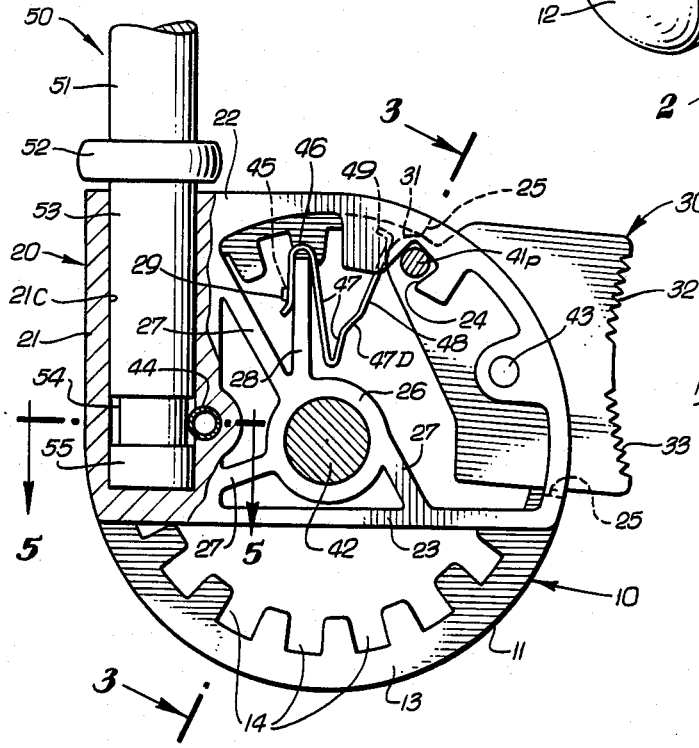
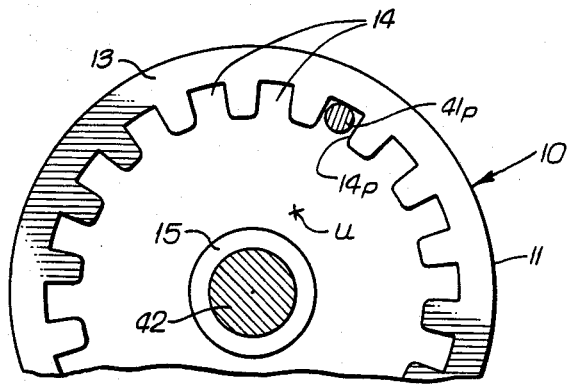

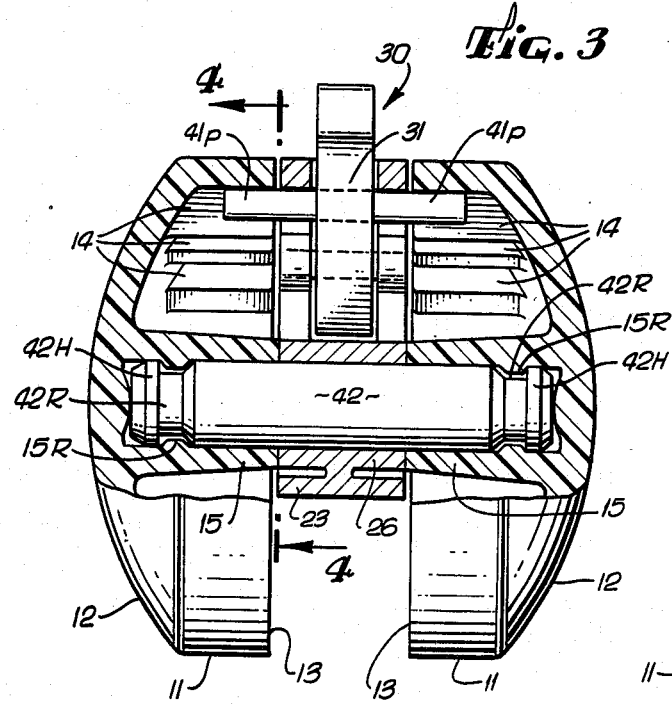
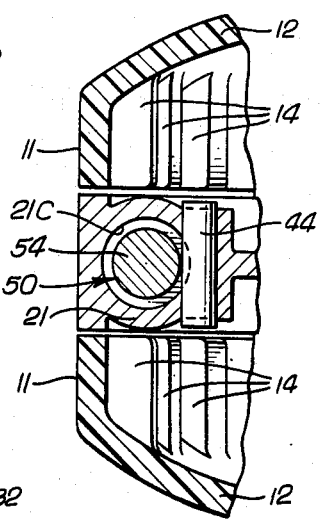
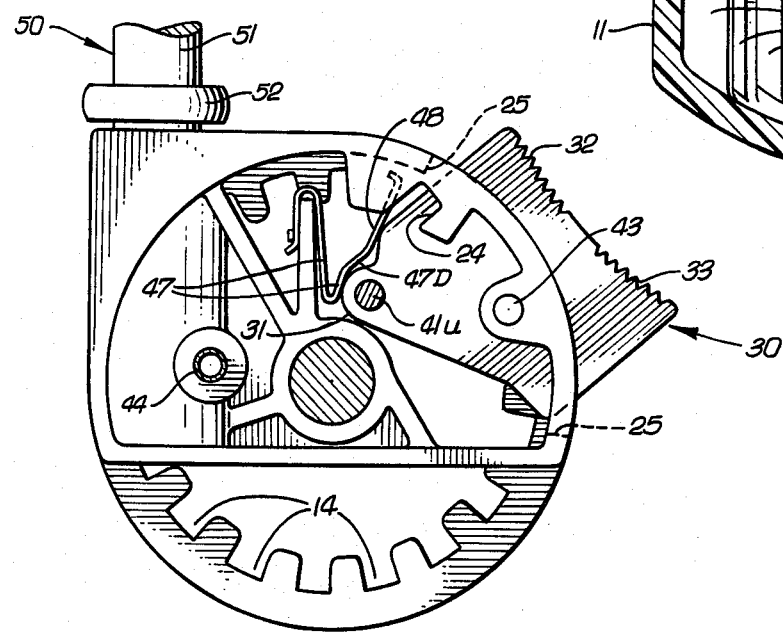

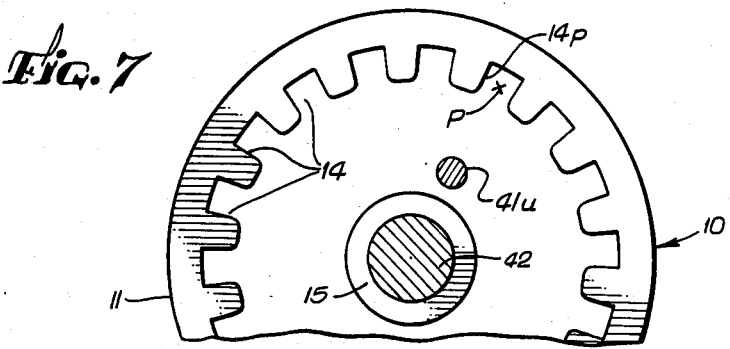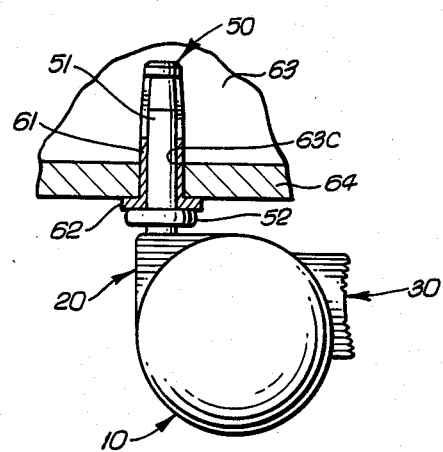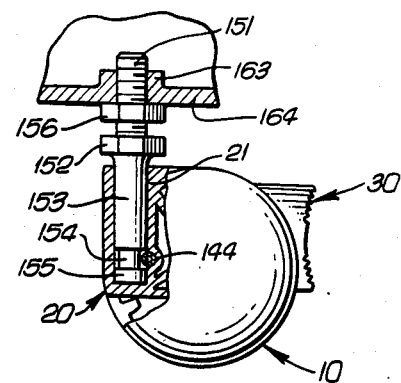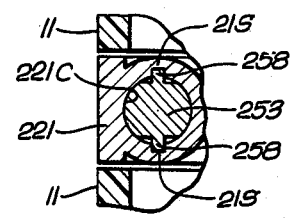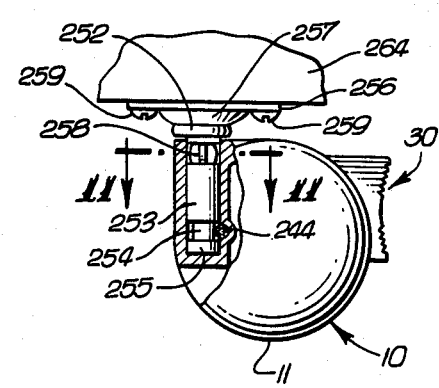

POSITIVE LOCK CASTER

This is a continuation of co-pending application Ser. No. 577,156 filed on Feb. 6, 1984 and now abandoned.

BACKGROUND OF THE INVENTION

1. Field of the Invention

This invention relates generally to casters for use in rollably supporting heavy or large objects—such as machinery or freight—on a floor, and more particularly to such casters that can be locked to prevent rolling when rolling is not desired.

2. Prior Art

Previous lockable casters have provided spring-loaded brake shoes biased or jammed against an internal wheel surface, or cam-type structures which wedge themselves against the outsides of the caster wheels.

Such devices, while very useful, have several limitations. The brake shoes or cams, and their mating wheel surfaces, are subject to wear—which can over the course of time shift the point int he locking action at which reliable locking actually occurs. Such a shift, in turn, can produce unexpected failures of locking action, and thereby extensive and expensive damage to the equipment or other supported objects.

Locking or unlocking some such devices requires undesirably large amounts of force. Applying force to the wheels as is done by some of the prior-art devices has a tendency to deface the outer surfaces of the wheels, making the casters unsightly; or to warp the wheels or damage their axles or bushings, thereby interfering with smooth rolling action (or with smooth pivoting action of the caster about a vertical axis) and sometimes causing objectionable scuffing of the floor.

Many of the prior-art devices make use of mechanical configurations in which the locking force is borne entirely by the mechanism which moves the brake shoe or cam into place against the wheel. If the supported equipment or other object is then forcefully shoved, the braking or camming mechanism can be damaged beyond repair, and the whole caster must then be replaced.

The present invention has as its objectives the elimination of these limitations, through provision of a caster which is positive-locking even after considerably usage and wear has occurred. The invention thus is directed to avoiding unexpected locking failures, avoiding defacement of the wheels and damage to axles or bushings, and avoiding using the actuating mechanism to bear the entire load of the locking forces. Further, the invention aims to provide for replacement of relatively inexpensive parts if the load is shoved with such great force that the positive-locking mechanism is damaged.

SUMMARY OF THE DISCLOSURE

Preferred embodiments of my invention provide a caster for use in supporting a heavy or large object on a floor. The caster has a housing, in and to which the various other components are mounted.

Some means for securing the housing to the heavy or large object must also be provided. The phrase "securing means" is used in portions of this document for referring to these means for securing the housing to the object to be supported.

The caster must have at least one wheel, rotatably mounted to the housing and adapted to roll on the floor. Some surface of the wheel must define a plurality of discrete notches. As the wheel is rotated, these notches are successively juxtaposed to a particular point on the housing.

The caster also has a locking pin, movably mounted to the housing. The mounting of this pin must be such that it can move to and away from the particular point on the housing just mentioned. When the locking pin is moved to the particular point, it (the pin) must extend from the housing to engage one of the notches. (This statement does not necessarily require that the pin extend outside of the housing, since instead the notched wheel surface may extend within the housing.)

It is also necessary to provide some means for effectuating the motion of the locking pin to and away from the particular point. These means, which are in parts of this document referred to as "effectuating means," should be responsive to manipulation by a user.

Thus the invention provides a positive-locking action, rather than an action that is in some way proportional to applied force or that is dependent upon the maintenance of effective frictional engagement of two surfaces.

Furthermore, the housing itself preferably defines a further distinct notch, and when the locking pin is moved to the particular point (at which locking action occurs) the pin enters this further notch—as well as the notches in the wheel surface. It is in this way that the locking forces are caused to be borne in large part by the locking pin, the housing, and the wheel surface, rather than entirely by the "effectuating means."

It is also advantageous to provide some means for biasing the locking pin to retain it positively in whatever position it is placed. These "biasing means" prevent the caster from simply falling out of locked condition (or from falling into such condition when it has been left unlocked). In effect the biasing means provide a toggling action: they retain the locking pin positively either at or away from the "particular point" when the locking pin is moved to or away from, respectively, the particular point by the user's manipulation of the effectuating means.

Preferably the surface of the wheel which defines the notches used for locking is an internal surface. This arrangement minimizes the hazard of catching objects (such as fingers, shoe-sole edges, electrical cords, etc.) in the mechanism, and it also minimizes the progressive degradation of appearance that results from inevitable wear of the mechanism—even when locking action is not significantly affected.

In my most preferred embodiment there is one wheel at one side of the housing, presenting to the housing its notched internal surface and presenting a closed outer surface to view by users and passersby; and there is a second wheel that is mounted to the other side of the housing, and that also has a notched internal surface for engagement with the locking pin when the pin is moved to the "particular point." This second wheel too presents to the housing its internal surface and presents a closed outer surface to view.

The result is a configuration that is particularly strong, since the caster is supported at both sides by separate wheels at those sides (though they are preferably mounted to a unitary axle that penetrates entirely through the housing and into both wheels), and also a configuration that optimizes the safety and appearance factors discussed above. The two wheels can advantageously be substantially identical.

The "securing means" mentioned earlier include, preferably, a shaft that is adapted to be secured to the object that the caster must support, and a cavity defined in the housing and configured to snugly receive the shaft. It is undesirable for the caster to fall off the supported object if the object is lifted from the floor. To avoid this the shaft should also define a retaining recess, and the securing means should include a retaining element that is firmly received in the housing after the shaft has been received in the cavity, and that engages the retaining recess.

Some casters are desirably rotatable about a vertical axis to permit ready pivoting and steering of the rollaby supported object. To effect this behavior, the shaft mentioned above is made rotatable, relative to the cavity, about an axis which in use is substantially vertical.

Other casters are desirably fixed against rotation, so that steering can be implemented only by casters at the other end of the supported object—or, in some cases, so that steering is impossible. To effect this behavior, while using parts that are as nearly as possible the same as those for rotatable casters, virtually the same shaft and cavity can be used but with the shaft keyed to the cavity to preclude their mutual rotation.

One particularly advantageous way to accomplish this is to make the shaft of a malleable material with a generally cylindrical surface—but, for those casters that are not to rotate, to provide the shaft with at least one "dog ear" formed in that cylindrical surface by pinch-shaping of the shaft material after formation of the cylindrical surface. The housing is then made to further define at least one antirotation slot, communicating with the cavity, for receiving the "dog ear."

The present invention is simply constructed, reliable, and relatively inexpensive. Its principles and advantages will be more fully appreciated upon consideration of the following detailed description, with reference to the appended drawings, of which:

BRIEF DESCRIPTION OF THE DRAWINGS

FIG. 1 is a perspective view of one preferred embodiment of my invention, fully assembled but not attached to a piece of equipment or other object to be supported.

FIG. 2 is an elevation of the FIG. 1 embodiment, partially in section, taken along the line 2—2 of FIG. 1. This view shows the caster locked.

FIG. 3 is a plan view of one wheel of the same embodiment, and also showing the axle and locking pin in section, taken along the line 3—3 of FIG. 2. This view shows the pin in locked position.

FIG. 4 is an elevation of the same embodiment, with two details shown in section, taken along the line 4—4 of FIG. 3.

FIG. 5 is a fragmentary plan view of the same embodiment, partially in section and taken along the line 5—5 of FIG. 2.

FIG. 6 is an elevation similar to FIG. 2, but with none of the housing shown in section. This view shows the caster unlocked.

FIG. 7 is an elevation similar to FIG. 3, but showing the locking pin in unlocked position.

FIGS. 8 through 11 shows preferred embodiments of my invention as attached to typical equipment or other objects to be supported.

In particular, FIG. 8 is an elevation of the simplest embodiment of my invention in a swivel mount, with the bottom of the equipment partially in section.

FIG. 9 is a similar view of an embodiment used when equipment levelling is required and large holes for mounting can be provided in the bottom of the equipment, and also showing part of the caster in section.

FIG. 10 is a similar view of an embodiment used when swivelling of the caster is undesirable and large holes for mounting are undesirable.

FIG. 11 is a plan view of the FIG. 10 embodiment, taken along the line 11—11 of FIG. 10.

DETAILED DESCRIPTION OF THE PREFERRED EMBODIMENTS

Figure 12:
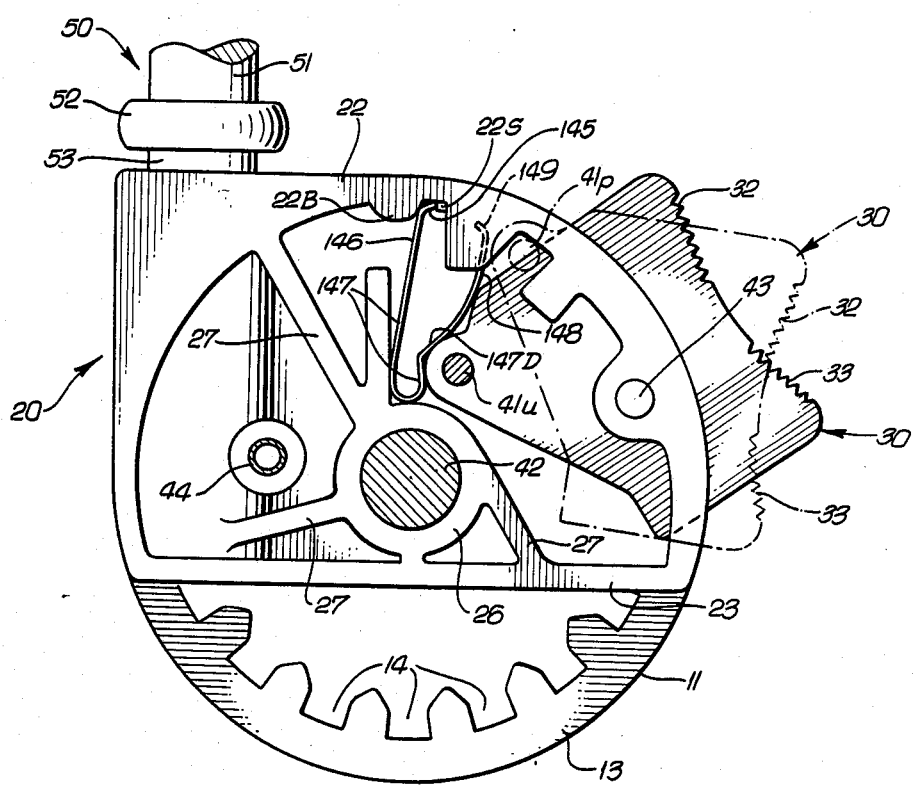
FIG. 12 is an elevation similar to that of FIG. 6, but showing an alternative embodiment of the spring-attachment geometry. This drawing also illustrates the locking mechanism in both locked and unlocked positions.

A preferred embodiment of my caster invention provides a housing 20, two substantially identical wheels 10, and a shaft 50 to act as "securing means" for securing the caster to equipment to be supported. In addition "effectuating means" 30 are operable relative to the housing to lock and unlock the caster.

The housing 20 includes an end section 21 in which there is a cylindrical vertical cavity 21C to hold the bottom sections 53-54-55 of the shaft 50. The shaft 50 has—from top to bottom—first an upper portion 51 that fits into the equipment to be supported, then a stop flange 52, a relatively long lower section 53 that stabilizes the shaft 50 relative to the housing end section 21, a retaining recess 54 to accommodate a retaining element 44, and finally a bottom portion 55 that is of sufficiently large diameter as not to pass the retaining element 44. The retaining element is preferably a rolled piece of sheet stock rather than a solid pin.

The housing 20 also includes an upper wall 22, a lower wall 23, a press-fit axle mount 26 for firmly gripping an axle 42, and internal structural members 27 for supporting the upper and lower walls 22 and 23 from the axle mount 26. It will be noticed that the housing is in large part hollow. Formed in the undersurface of the upper wall 22 is a distinct notch 24 for receiving a locking pin at 41p. (The reference numeral "41" here refers to the pin itself, and the suffix "p" refers to the particular point relative to the housing at which the locking pin 41 must be to effect the positive locking action. The position "p" is shown alone in FIG. 7.)

Also defined in the upper wall 22 is a slot 25, passing entirely through the upper wall, to accommodate a control handle 30 which provides part of the "effectuating means" mentioned earlier. Another part of the effectuating means is a pivot pin 43, mounted in the housing wall and supporting the control handle 30 so that the handle rotates relative to the housing.

The control handle is formed with knurled or equivalently traction-formed actuating surfaces 32 and 33. When a user presses the lower one of these surfaces 33 inward, the handle 30 rotates clockwise (as drawn) about pivot pin 43 and moves the locking pin into the particular position at 41p, relative to the housing, at which the caster is locked. When a user presses the upper surface 32 inward, the handle 30 rotates counterclockwise about the pivot pin 43, moving the locking pin into a different position at 41u (FIG. 6), to unlock the caster. (The reference numeral "41" here, as before, refers to the pin itself, and the suffix "u" refers to the unlocked position of the locking pin 41, relative to the housing. The position "u" is shown alone in FIG. 4.)

A pillar 28 is supported from the axle mount 26, within the hollow cavity of the housing. As shown in FIGS. 2 and 6, this pillar 28 facilitates the mounting of a sheet-metal spring (leaf spring) 45–49, which is used for imparting a toggle action to the control handle 30.

The spring has a square hole 45 near one end that is fitted over a small retaining post 29 on the pillar. The spring then passes in a hairpin shape at 46 over the pillar 28, and forms resilient portiosn 47, 47D and 48, and finally a short end-portion 49. The resilient portion 48 acts as a bearing surface against which the actuating end-surface 31 of the control handle 30 can slide.

When the control handle 30 is in its locked position (as in FIG. 2) the upper portions 48–49 of the spring press the actuating end-surface 31 clockwise, thus tending to retain the control handle in the locked position. When the handle is in its unlocked position (as in FIG. 6), however, the lower portions 47–47D of the spring press the actuating end-surface 31 counterclockwise, thus tending to retain the control handle in the unlocked position. The short dogleg section 47D aids in this action, tending to form a detent to prevent inadvertent locking of the caster.

FIG. 12 illustrates an alternative arrangement for the securing of the spring 145–149. This configuration is preferred for its economy, although as will be seen the functional result is essentially identical. The version of FIG. 12 has a tip or short end-portion 149, resilient forward upper portion 148, dogleg section 147D, and resilient lower portions 147 that are all virtually the same as the correspondingly numbered features (that is, the same reference numerals except for the omission of the prefix "1") in FIGS. 2 and 6.

The more rearward of the two lower portions 147, however, instead of leading to a hairpin shape for passing over a pillar, terminates instead in an essentially straight upper section 146 followed by a forwardly angled tip 149. The housing upper wall carries a downwardly extending boss 22B and a small, sharply contoured stop 22S. The tip 149 of the rearward end of the spring is captured between the boss 22B and the stop 22S. In particular, the stop 22s forms a sharp internal corner with the undersurface of the upper wall 22. By virtue of the dimensional relations between the spring and the housing, the tip 149 of the spring is very firmly driven into this sharp internal corner, where it is thereby permanently secured.

Now returning to the general discussion of the other drawings, the wheel or wheels 10 each have a rim 13 with peripheral cylindrical surfce 11 that contacts the floor, and a domed surface 12 which is integral with and supported by the rim 13 and which in turn support the axle 42, and thus the rest of the caster. Formed on the inner face of the domed surface 12 is a bushing 15 into which the axle 42 fits.

Each end of the axle is formed with a groove or relieved portion 42R, followed by a head portion 42H, which engage mating internal ridge 15R in the internal cylindrical surface of the bushing 15. The axle thus must be pressed into the wheels, a slight resiliency of the wheel permitting the head 42H to pass the ridge 15R, whereupon the wheel is effectively locked onto the axle. Should the wheel be damaged, however, it can by application of suitable force be pulled off for replacement.

Discrete notches 14 are formed on the inner surface of the rim 13. The locking pin 41 when in locking position 41p will fit into whichever one of these notches 14p happens to be juxtaposed to the particular point "p" on the housing.

If the supported equipment is shoved while the caster is locked, the force applied to the housing must be transmitted to the locking pin and thereby to the wheel or wheels, to prevent rolling. In the absence of the distinct notch 24 in the housing wall 25, at position "p," the force applied to the housing would be transmitted entirely via the pivot pin 43 and the body of the control handle 30 to the locking pin 41, and thence to one of the notches 14 in each wheel rim 13.

This has the disadvantage that relatively light forces—in terms of the forces that may typically be applied to equipment, furniture, or freight—can deform the pivot pin 43, and/or its mounting hole in the housing wall 25, to the extent that the control handle 30 will no longer pivot smoothly.

In the preferred embodiment that is illustrated, however, and particularly as best shown in FIGS. 3 and 4, when the locking pin 41 is at position "p" it engages both (1) the discrete notches 14 formed on the inner surfaces of the wheel rims 13, and (2) the distinct notch 24 formed on the undersurface of the housing upper wall 25.

With this arrangement the force on the housing can be transmitted in large part by the wall of the notch 24, rather than entirely by the pivot pin 43. Considerable deformation of these elements can be accepted without impairing their locking or load-bearing functions. Consequently the distinct notch 24 tends to extend the useful life of the caster.

Alternative embodiments, with respect to details of the "securing means" mentioned earlier, are shown in FIGS. 8 through 10.

In FIG. 8 a cavity 63C is formed in the floor 64 of the equipment to be supported—and in any mass 63 immediately above (or continuous with) the floor 64. Into this cavity 63C is inserted a conventional caster-installation bushing 61, with stop flange 62. The upper shaft portion 51 is then inserted into the bushing 61, and the caster is thereby secured to the equipment. The caster can swivel by rotation of the housing end portion 21 relative to the lower portions 53, 54 and 55 of the shaft 50.

In FIG. 9 there is assumed a floor 164 capable of being drilled and tapped; if necessary, additional thickness for a sufficient number of threads may be provided in the form of an integral boss 163. The upper portion 151 of the "securing means" shaft is threaded to mate with the hole in the floor 164 (and boss 163). Before the threaded shaft portion 151 is screwed into the hole, however, a leveling nut 156 is first screwed onto the shaft portion 151.

A hex-shaped or otherwise grippable central flange 152 is formed integrally with the upper shaft portion 151 and with the lower portions 153, 154 and 155— which latter three portions are all substantially identical to the corresponding sectiosn 53, 54 and 55 of the embodiment illustrated in the preceding drawings. After the threaded shaft portion 151 has been screwed into the floor 164, a user can, by gripping the flange 152 and rotating the leveling nut 156, adjust the height of the equipment floor 164 relative to the room floor on which the caster rests. As before, the caster can swivel relative to the load.

FIGS. 10 and 11 illustrate an embodiment in whicht he caster is secured against swiveling. In this embodiment the upper part of the "securing means" shaft is attached to a mounting bracket 256, which is belled downward at 257 to accommodate the truncated upper end of the shaft.

The lower portions 252, 253, 254 and 255 of the shaft are generally identical to the portions 52, 53, 54 and 55 of the shaft first described, with one important exception. The shaft portion 253 is pinch-formed near its upper end into at least one "dog-ear" shape 258.

It is to be understood that all of the foregoing detailed descriptions are by way of example only, and not to be taken as limiting the scope of my invention—which is expressed only in the appended claims.

I claim:

1. A positive locking caster for supporting an object on a surface comprising:
   a housing having a distinct notch formed therein;
   a wheel rotatively mounted to said housing and adapted to roll on the surface, said wheel having a surface defining a plurality of discrete notches, each of said discrete notches being rotatable to a position next to said distinct notch;
   a locking pin movably mounted on said housing, said pin being movable into said distinct notch and one of said discrete notches for locking engagement, said locking pin also being movable out of said distinct notch and one of said discrete notches to unlock said wheel;
   control means mounted on said housing and attached to said locking pin for moving said locking pin into and out of locking engagement within said distinct notch and one of said discrete notches;
   biasing means in contact with said control means for maintaining said locking pin into and out of locking engagement within said distinct and one of said discrete notches; and
   means for securing said housing to the object.

2. The caster of claim 1 wherein the notch-defining surface of the wheel is an internal surface of the wheel.

3. The caster of claim 2:
   wherein said wheel is at one side of the said housing, and presents to the said housing its internal surface, and presents a closed outer surface to view by a user; and
   the caster also comprises a second wheel that:
   is mounted to the other side of said housing, and
   also comprises an internal surface which defines a plurality of discrete notches, wherein each discrete notch is aligned opposite a discrete notch on said first wheel and is adapted to receive said locking pin, and
   also presents to said housing its internal surface and presents a closed outer surface to view by a user.

4. The caster of claim 3, wherein said second wheel is substantially identical to the first-mentioned wheel.

5. The caster of claim 1 wherein:
   the securing means comprise a shaft that is adapted to be secured to such object; and
   the housing defines a cavity configured to snugly receive the shaft.

6. the caster of claim 5:
   wherein the sahft defines a retaining recess; and
   the securing means further include a retaining element attached to said housing that engages the retaining recess.

7. The caster of claim 5 wherein the shaft is rotatable, relative to the cavity, about an axis which in use is substantially vertical.

8. The caster of claim 5 wherein the shaft is keyed to the cavity to preclude rotation of the shaft, relative to the cavity.

9. The caster of claim 8 wherein:
   the shaft is of a malleable material and has a generally cylindrical surface but has at least one dog ear formed in that surface by pinch-shaping of the shaft material after formation of the cylindrical surface; and
   the housing further defines at least one antirotation slot, communicating with the cavity, for receiving the dog ear.

10. A positive locking caster for supporting an object on a surface comprising:
    a housing having a distinct notch formed therein;
    means for securing said hosuing to such object;
    a first wheel rotatively mounted on one side of said housing and adapted to roll on the surface, an inner surface of said first wheel defining a plurality of discrete notches that are rotatable to a position next to said distinct notch, said first wheel presenting a closed outer surface to the view of the user;
    a second wheel rotatively mounted to the other side of said housing and adapted to roll on the surface, an inner surface of said second wheel defining a plurality of discrete notches that are aligned opposite said discrete notches on said first wheel, said second wheel presenting a closed outer surface to view of the user, said second wheel being substantially identical to said first wheel;
    a control handle including an end surface and pivotally mounted to said housing;
    a locking pin attached to said control handle, said locking pin being movable by said control handle into said distinct notch and one of said discrete notches on each of said first and second wheels for locking said wheels, said pin also being movable out of said distinct and discrete notches for unlocking said wheels; and
    a leaf spring affixed to said housing that includes a flattened, bearing surface, said end surface of said control handle being movable along said bearing surface, said leaf spring imparting a force on said handle that maintains said locking pin in and out of locking engagement with said distinct notch and said discrete notches.

11. The caster of claim 10 wherein said bearing surface of said leaf spring remains in continuous contact with said end surface of said control handle.

12. The caster of claim 11 wherein said control handle includes an upper and lower activating surface, said activating surfaces being movable to move said locking pin into and out of locking engagement with said distinct notch and said discrete notches on each of said wheels.

13. A positive locking castor for supporting an object on a surface comprising:
    a housing having a distinct notch formed therein;
    a wheel rotatively mounted to said housing and adapted to roll on the surface, said wheel having a surface defining a plurality of discrete notches, each of said discrete notches being rotatable to a position next to said distinct notch;
    a locking pin movably mounted on said housing, said pin being movable into said distinct notch and one of said discrete notches for locking engagement, said locking pin also being movable out of said distinct notch and one of said distinct notches to unlock said wheel;

a control handle pivotly mounted to said housing and attached to said locking pin for moving said locking pin into and out of locking engagement within said distinct notch and one of said discrete notches;

a leaf spring for maintaining said locking pin into and out of locking engagement within said distinct and one of said discrete notches, said leaf spring including a flattened, bearing surface, said control handle having an end surface that moves along and continuously contacts said bearing surface of said leaf spring; and means for securing said housing to the object.

14. The caster of claim 13 wherein the notch-defining surface of the wheel is an internal surface of the wheel.

15. The caster of claim 14:
wherein said wheel is at one side of the said housing, and presents to said hosuing its internal surface, and presents a closed outer surface to view by a user; and the caster also comprises a second wheel that:
is mounted to the other side of said housing, and
also comprises an internal surface which defines a plurality of discrete notches, wherein each discrete notch is aligned opposite a discrete notch on said first wheel and is adapted to receive said locking pin, and
also presents to said housing it internal surface and presents a closed outer surface to view by a user.

16. The caster of claim 15, wherein said second wheel is substantially identical to the first-mentioned wheel.

17. The caster of claim 13 wherien said discrete notch is positioned next to said distinct notch so that said distinct notch and said discrete notch are aligned to receive said locking pin simultaneously.

18. The caster of claim 17 wherein the notch-defining surface of the wheel is an internal surface of the wheel.

19. The caster of claim 18:
wherein said wheel is at one side of the said housing, and presents to said housing its internal surface, and presents a closed outer surface to view by a user; and the caster also comprises a second wheel that:
is mounted to the other side of said housing, and
also comprises an internal surface which defines a plurality of discrete notches, wherein each discrete notch is aligned opposite a discrete notch on said first wheel and is adapted to receive said locking pin, and
also presents to said housing its internal surface and presents a closed outer surface to view by a user.

20. The caster of claim 19, wherein said second wheel is substantially identical to the first-mentioned wheel.

* * * * *